(12) United States Patent
Harguth

(10) Patent No.: US 6,203,126 B1
(45) Date of Patent: Mar. 20, 2001

(54) TRACTION STUD FOR A SNOWMOBILE BELT MADE OF A NON-METAL MATERIAL

(75) Inventor: Sean Harguth, Nisswa, MN (US)

(73) Assignee: Northern Freight Brokers, Inc., Nisswa, MN (US)

( * ) Notice: Subject to any disclaimer, the term of this patent is extended or adjusted under 35 U.S.C. 154(b) by 0 days.

(21) Appl. No.: 09/092,479

(22) Filed: Jun. 5, 1998

(51) Int. Cl.⁷ .................................................. B62D 55/28
(52) U.S. Cl. ............................................ 305/180; 305/162
(58) Field of Search .................................. 305/157, 160, 305/161, 162, 165, 180, 159

(56) References Cited

U.S. PATENT DOCUMENTS

| 4,758,055 | | 7/1988 | Anderson . | |
|---|---|---|---|---|
| 5,188,441 | * | 2/1993 | Rubel | 305/165 X |
| 5,234,266 | | 8/1993 | Musselman et al. . | |
| 5,641,214 | * | 6/1997 | Kafka | 305/180 |
| 5,676,437 | * | 10/1997 | Holmgren et al. | 305/180 |
| 5,685,621 | * | 11/1997 | Nugent | 305/180 |

OTHER PUBLICATIONS

Snowmobile Parts Unlimited 1998 Catalog pp. 272–293, Oct. 1997.*

* cited by examiner

*Primary Examiner*—Russell D. Stormer
(74) *Attorney, Agent, or Firm*—Malcolm D. Reid; Cecilia M. Jaisle; Peter Forrest

(57) ABSTRACT

A traction device for mounting on an endless track includes these components: an axial threaded shank with a head at one end, a T-nut with a base and a neck extending from the base, so that the neck is mountable on the shank, with the base at the shank head, a washer plate threadably fastenable on the T-nut on the shank, and a stud threadably mountable on the washer plate on the shank, to fasten the stud to the shank. The endless track is positioned between the T-nut and the back plate, with the shank extending through an opening in the track. A stud for a traction may be metal or nonmetal, such as composite with a metal insert. A paddle is mountable on a plurality of traction device pediments across a width of the track.

17 Claims, 13 Drawing Sheets

-Top View-

- Top View -

- Top View -

FIG. 9A  FIG. 9B  FIG. 9C
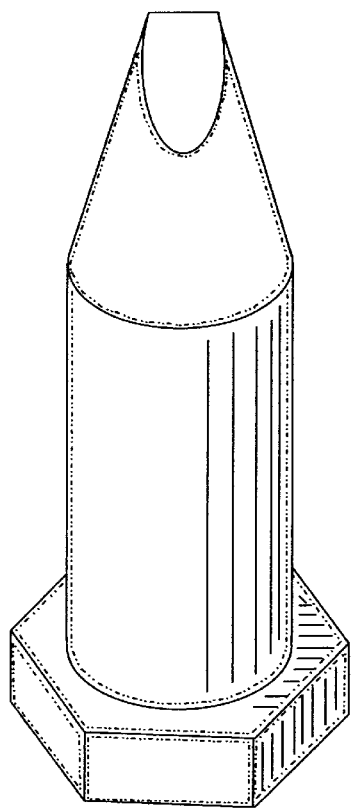 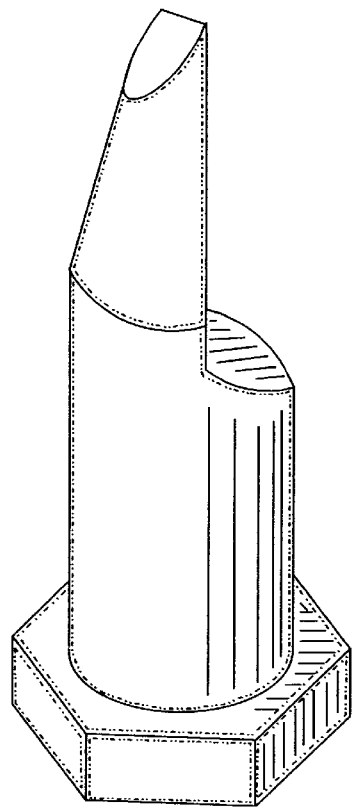 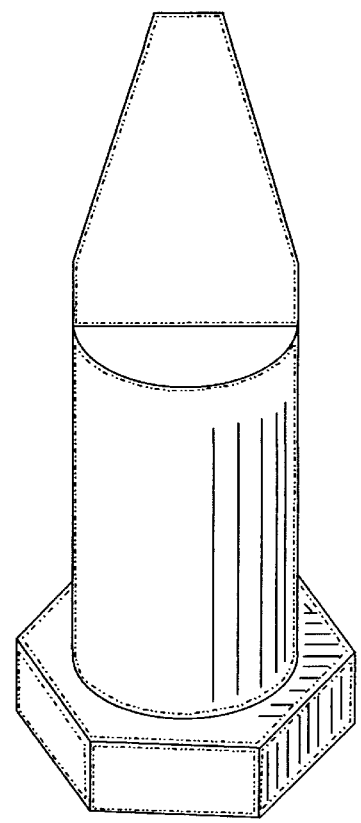
FIG. 9D
- TOP View -
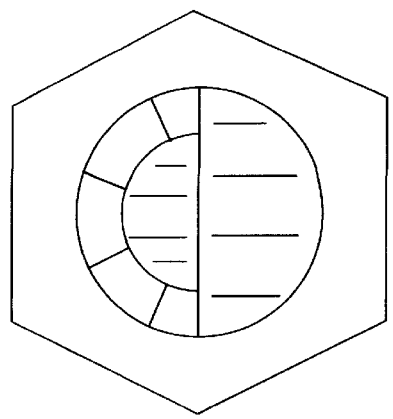

TRACTION STUD FOR A SNOWMOBILE BELT MADE OF A NON-METAL MATERIAL

BACKGROUND OF THE INVENTION

1. Field of the Invention

The traction device of this invention provides additional traction for snowmobiles adaptable for a variety of conditions, including ice, deep powder snow, grass and other surfaces. In addition, this traction device includes a specially designed composite stud that is effective for use on off-road winter surfaces, such as snow, ice and deep powder, while being nondestructive for use on paved road surfaces, such as asphalt and concrete. The present traction device includes a number of elements to constitute a traction device pediment, which may remain permanently attached to the snowmobile track, and a variety of interchangeable components, selectively attachable to the pediment for providing traction for a specific terrain.

2. Description of the Related Art

Studs for snowmobile tracks are described, for example, by Anderson, U.S. Pat. No. 4,758,055, issued Jul. 19, 1988. The Anderson studs have shanks, which pass through apertures in a snowmobile track, and planar heads that, when mounted on the shanks, create a bulge of the track material about the perimeter of the head. As the track travels continuously about the snowmobile drive and idler wheels, these bulges produce vibration adding to the noise level and riding discomfort.

Musselman, et al., U.S. Pat. No. 5.234,266, issued Aug. 10, 1993, also describes traction studs for attachment to the snowmobile track. The Musselman studs are said to decrease the disadvantages noted in the Anderson studs. However, the Musselman device provides only a single traction tip, perhaps best suited to icy terrain, and does not enhance traction for other types of weather and surface conditions.

The 1998 edition of the catalog, Parts Unlimited, published by Lemans Corp., Janesville, Wis., at pages 270–293, inter alia, relates to a wide variety of traction enhancing devices for attachment to a snowmobile track. While these products can provide additional traction under several surface conditions, these products tend to fall into two classes. One class, as represented, for example, by the Woody's brand, ROADRUNNER, by the Roetin brand, and by the Saber brand, require insertion and removal of the device components from the track inner surface to attach differently shaped stud tips. Another class, as represented, for example, by the Woody's brand of studs, which are screw-attachable to T-nuts, do allow replacement of the stud component from the outside of the snowmobile track, but require positioning the T-nut on the inner track surface during screwing and unscrewing the individual studs.

Accordingly, there is a need for a traction device for snowmobile tracks and the like which provides a pediment that may remain permanently attached to the track, while providing means to remove quickly and easily and replace a variety of studs suitable for specific terrain conditions. In addition, there is a need for a lighter weight traction device to decrease the overall weight of a plurality of traction devices positioned on a snowmobile track and the like, to allow increased speed and fuel economy. There is also a need for a traction device that will provide needed traction on off-road conditions, while being nondestructive to paved roadways, such as asphalt and concrete. Recent legislation in some states, including Minnesota, prohibits the use of steel or other hard metal studs on paved roadways, due to their destructive effect on such surfaces. These and other advantages are provided by the traction device of the present invention.

SUMMARY OF THE INVENTION

A traction device of this invention is designed and adapted for mounting on an endless track, such as a snowmobile track, and includes these components. An axial threaded shank has a head at one end. A T-nut has a base and a neck extending from the base, so that the neck is mountable on the shank, with the base at the shank head. In use, the shank had and T-nut are positioned at an inner track surface and the threaded shank extends through an opening in the track. A washer plate is threadably fastenable on the T-nut on the shank. In use the washer plate is positioned at an outer track surface and locks tightly on the shank. These three components, the shank, the T-nut and the washer plate comprise a pediment for the traction device. The pediment may remain permanently attached to the track for interchangeably receiving a variety of studs for different terrain conditions. When no stud is required, the threaded shank may be capped with a blind tip. When needed, a stud is threadably mountable on the washer plate on the shank, to fasten the stud to the shank.

In an alternative embodiment of a traction device of this invention, the base and the T-nut together may constitute a back piece, having the features of the base and mounted T-nut, and the stud and the washer plate may constitute a top, having the features of the washer plate and the stud. The alternative embodiment of the traction device may otherwise incorporate all of the features of the first embodiment, described herein.

A novel stud for a traction device for mounting on a snowmobile track or the like is nonmetal, such as composite. The stud has a metal insert, which may be interiorly threaded, for attachment to a traction device pediment of this invention. Alternatively, the stud or the metal insert may have a threaded shaft extending therefrom, for attachment to a base of a known traction device, such as the T-nut bases described in the *Parts Unlimited* 1998 catalog, referred to above.

A novel paddle of this invention is mountable on a plurality of traction device supports of this invention mounted across a width of the track. The paddle has three faces extending across the track width. One face is provided with a plurality of apertures for each receiving a threaded shank of a pediment. The other two faces angle toward each other, axially outward from the track, with access between the two faces for positioning fastening means on each shank for retaining the paddle on the track.

DESCRIPTION OF THE DRAWINGS

FIGS. 9A, B, C and D illustrate three side elevational and a top view, respectively, of a claw tip for use with a traction device of this invention.

DETAILED DESCRIPTION OF THE INVENTION

Figure 1:
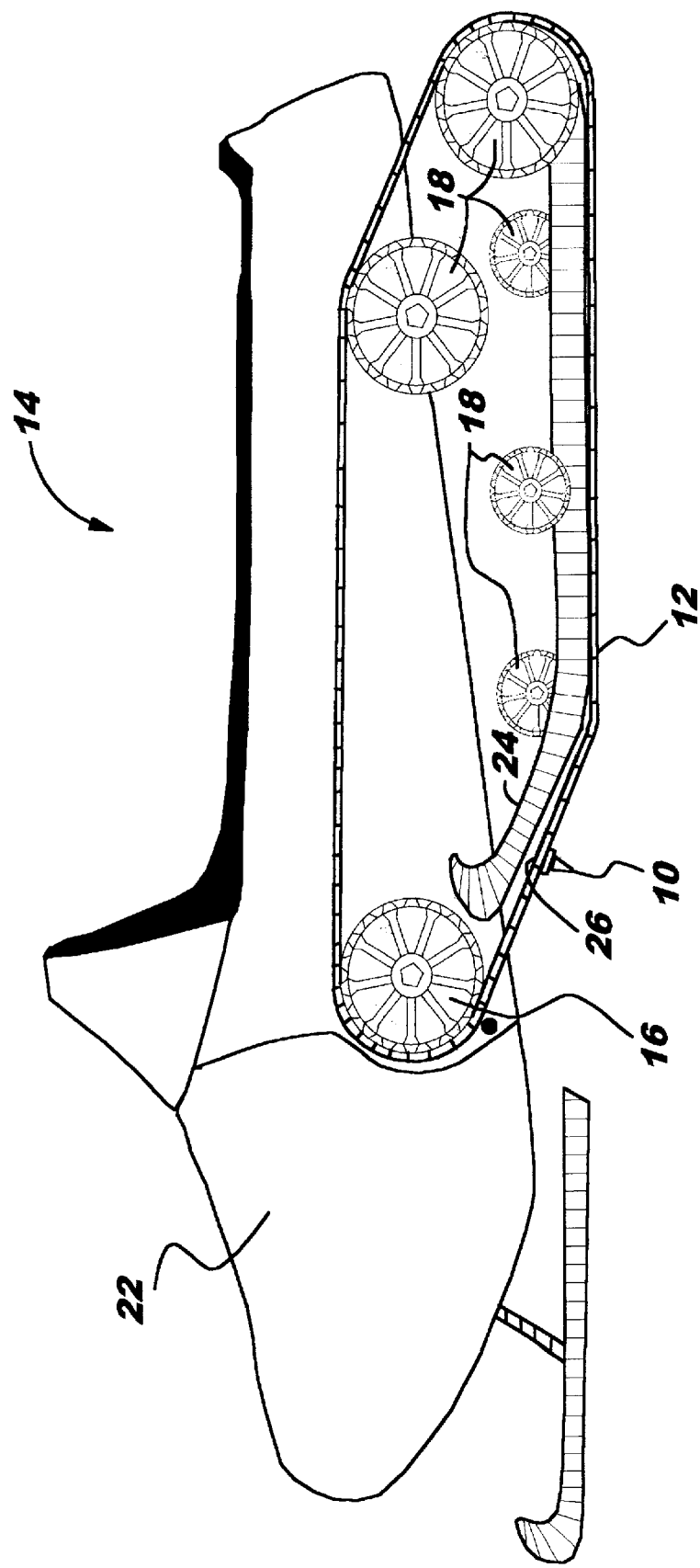
FIG. 1 is a side elevational view of a snowmobile equipped with a traction device of the present invention.
Figure 2:
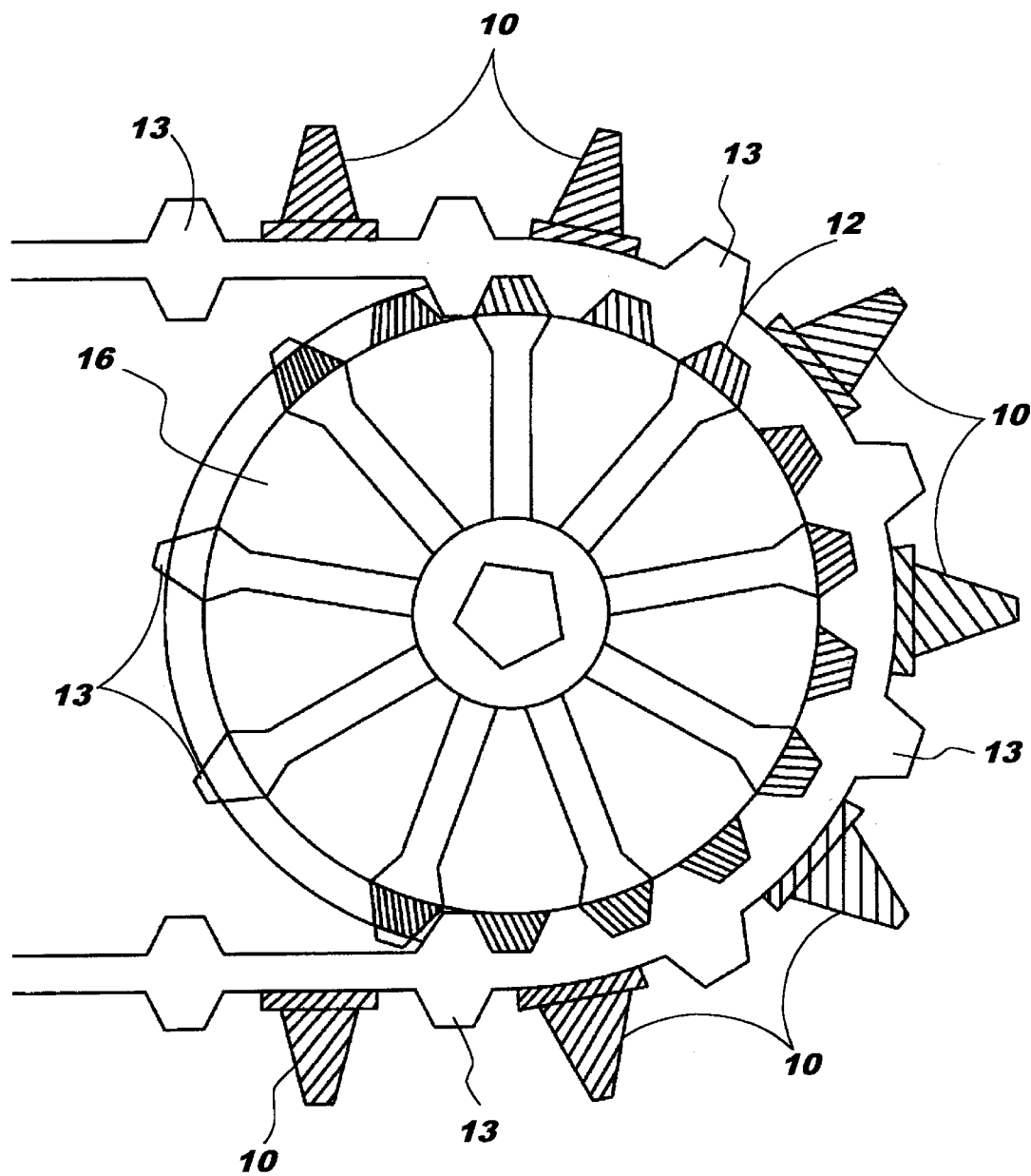
FIG. 2 is an enlarged side elevational view illustrating a front drive wheel and a snowmobile belt mounted thereon, with traction devices of this invention installed on the belt.

FIG. 1 illustrates a traction device 10 of the present invention in position on a belt or track 12 of a typical snowmobile 14. The traction device 10 is made to any convenient height, with a minimum height being at least greater than the height of the lugs 13 of the belt or track 12. The snowmobile 14, as is conventional, has a front rotatable drive wheel 16 and a plurality of idle wheels 18 of differing diameters. The endless resilient snowmobile belt or track 12 travels about the wheels 16, 18. A snowmobile body 22 is supported on suspension system 24. The drive wheel 16 is powered and rotatably driven by an engine (not shown). FIG. 2 shows the front drive wheel 16 and the snowmobile belt or track 12 mounted thereon, with a traction device 10 of this invention installed on the belt 12. The belt 12 includes a plurality of spaced apart openings 26 for positioning the traction devices 10 of this invention. One possible array of openings 26 is illustrated, for example, in FIG. 4, although other arrays may be used, depending on the number and distribution of traction devices 10 desired.

Figure 3:
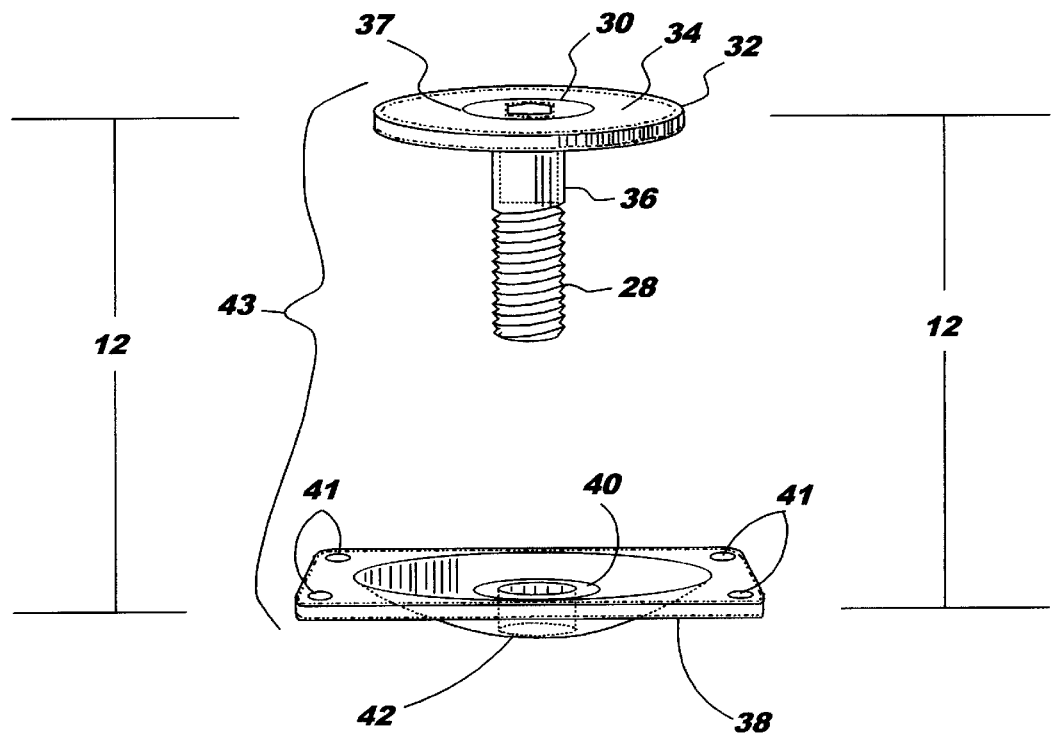
FIG. 3 is a partially sectional side view illustrating the components of the traction device of the present invention in position for assembly.
Figure 3:
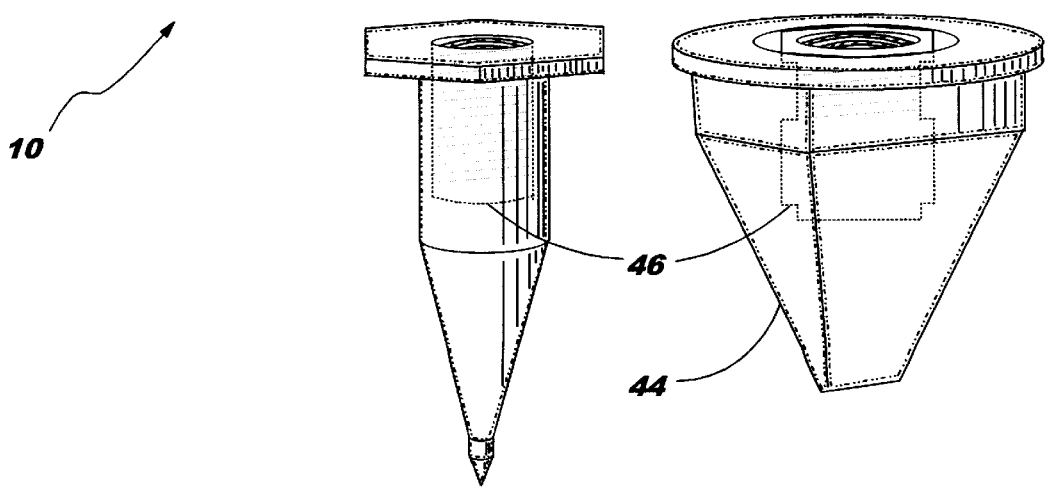

FIG. 3 shows the components of the traction device 10 of the present invention in position for assembly onto a track 12 of a snowmobile 14. An axial threaded shank 28 has a head 30 at one end. The shank head 30 preferably has a central hex-shaped recess 31, for insertion of a hex-shaped tool, such as an Allen wrench, to hold the shank 28 against rotation during threading of further device 10 components. A T-nut 32 has a base 34 and a neck 36 extending from the base 34. The neck 36, which preferably has no interior threading, is mountable on the shank 28, with the base 34 at the shank head 30. The bottom T-nut 32 surface is preferably countersunk 37 to receive the shank head 30. With the T-nut 32 mounted on the shank 28, the length of the axial threaded shank 28 is inserted into the opening 26 to extend through the belt 12 and protrude from the belt 12 outer surface.

A washer plate 38, with interior threading to match the shank 28 threading, is threadably fastenable on the T-nut 32 on the shank 28. The washer plate 38 preferably has a concave surface 40 toward the T-nut 32 and an opposing convex surface 42. The washer plate 38 is tightened onto the shank 28, with the extent of tightening limited by the thickness of the compressed belt 12 and the height of the neck 36 of the T-nut. The concave surface 40 of the washer plate 38 provides a recess for receiving a small bulge of belt 12 material urged upward therein by tightening of the washer plate 38 onto the shank 28. Also, the concave surface 40 puts pressure around the outer edge of the washer plate 38 for greater holding strength. The washer plate 38, together with the shank 28 and the T-nut 32, are designed and adapted to tighten securely together, so that these three components together comprise a pediment 43 for a traction device 10 that may remain permanently attached to the belt 12, so that various other traction components may be removably attachable to the pediment 43. The washer plate 38 preferably has perimeter recesses 41 for receiving a spanner wrench, for use in tightening. A stud 44, with interior threading 46 to match the shank 28 threading, is threadably fastenable on the washer plate 38 on the shank 28, to fasten the stud 44 to the shank 28, that is, to fasten the stud 44 to the pediment 43.

Figure 5:
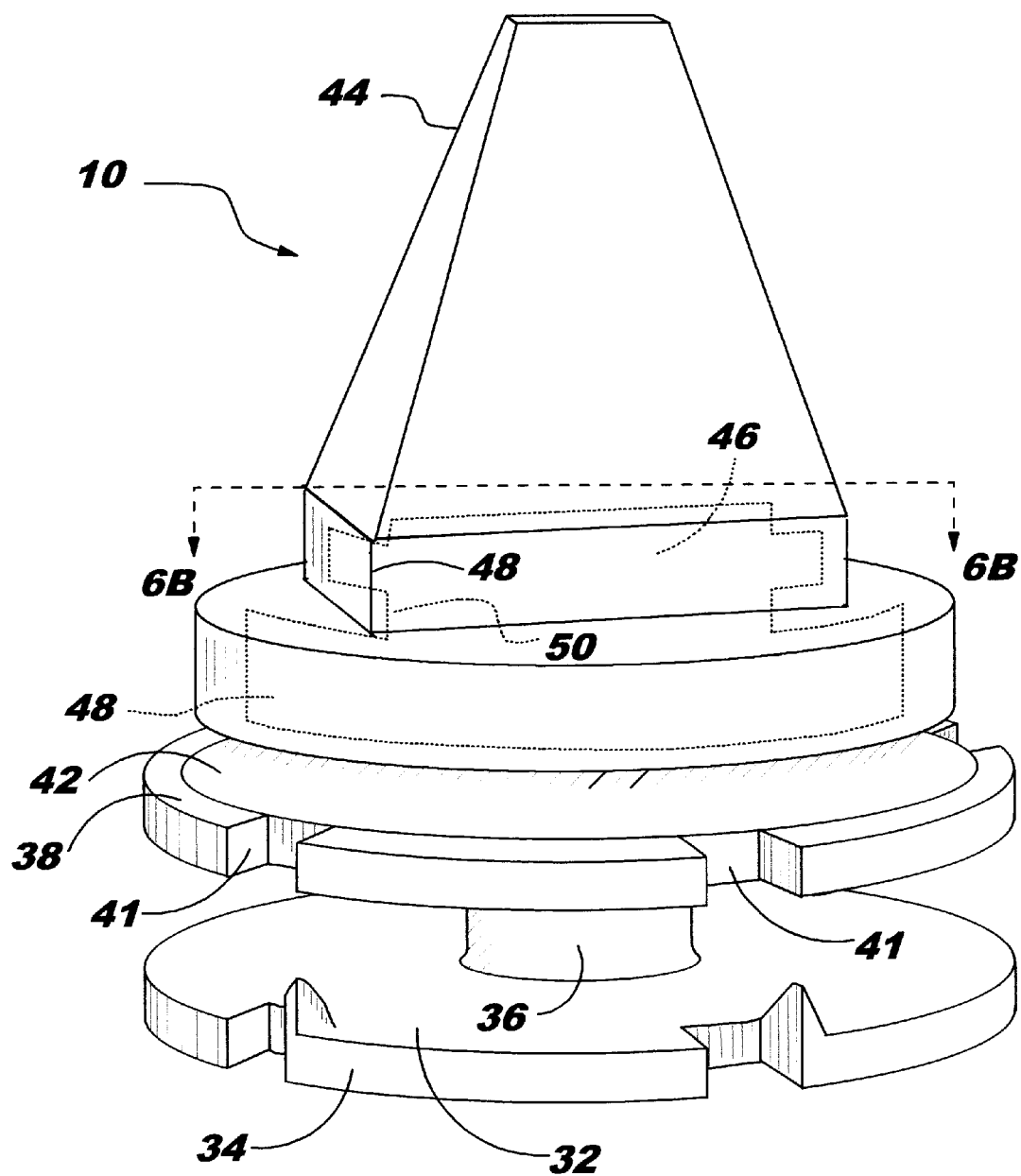
FIG. 5 is a partially sectional side elevational view of a composite tip, showing the metal insert in phantom.
Figure 6A:
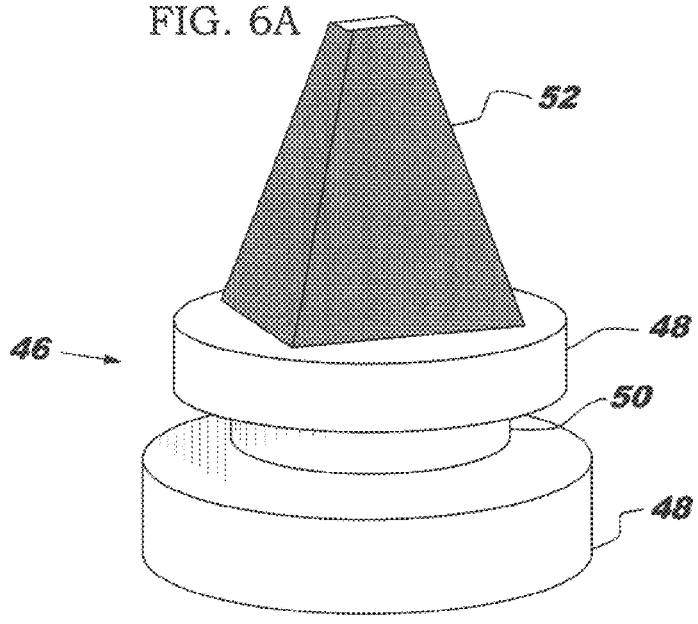
FIG. 6A shows a side elevational view of the metal insert of FIG. 5.
Figure 6B:
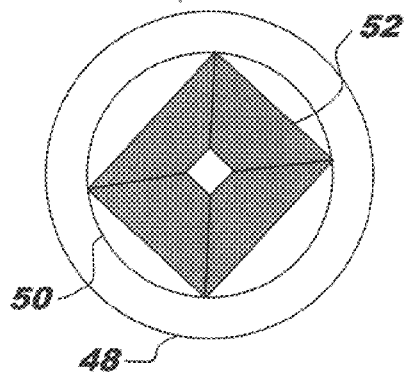
FIG. 6B shows a top view of the metal insert of FIGS. 5 and 6A.
Figure 7A:
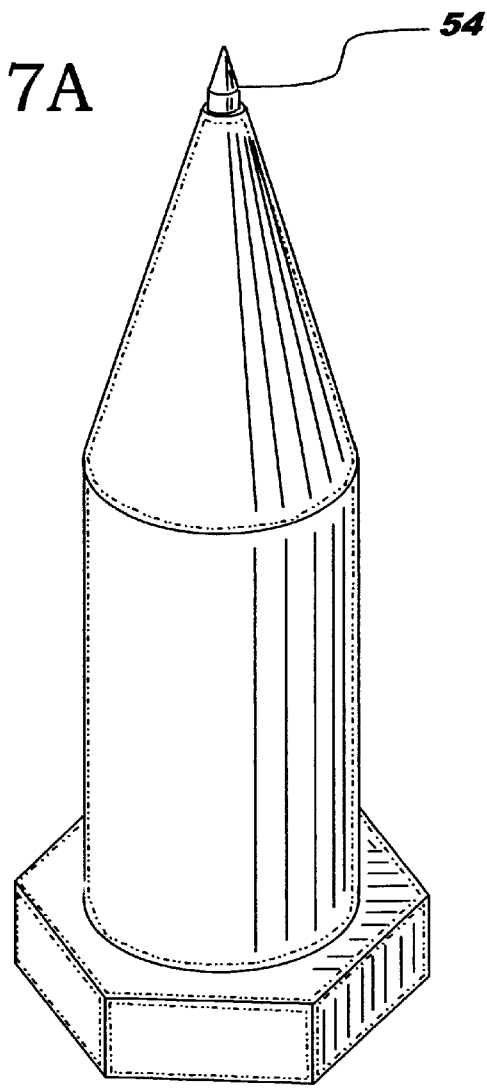
FIGS. 7A and B illustrate a side elevational and top view, respectively, of a metal stud with a carbide tip for use with a traction device of this invention.
Figure 7B:
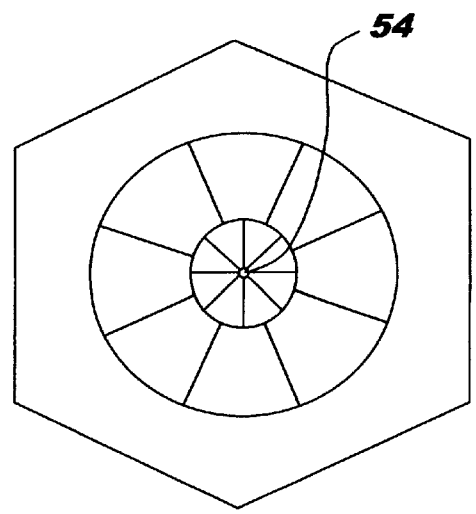
Figure 8A:
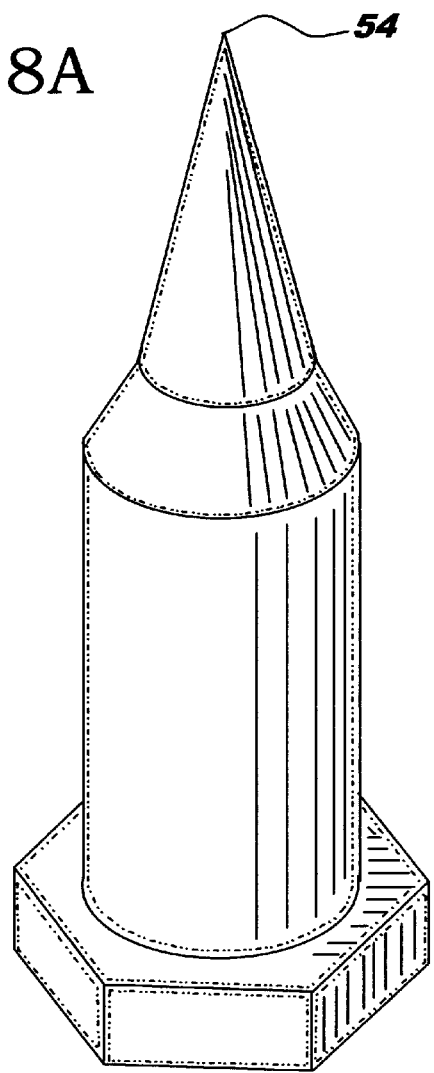
FIGS. 8A and B illustrate a side elevational and top view, respectively, of a stilletto stud for use with a traction device of this invention.
Figure 8B:
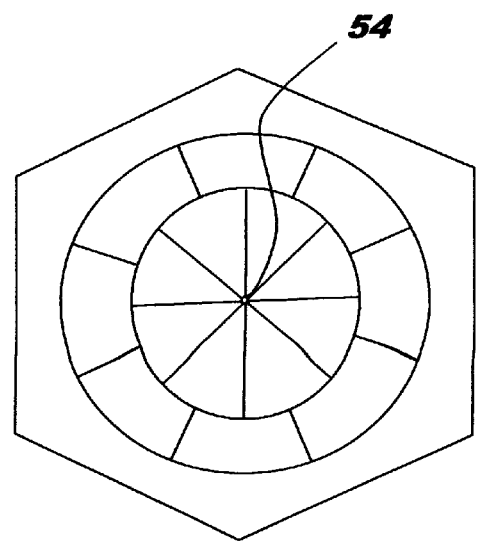

The stud may have various configurations, designed and adapted to meet the needs of various terrain and use conditions. The stud, illustrated in FIGS. 3, 5, 8 and 9, may be constructed of a nonmetal, such as a composite. The nonmetal stud is preferably constructed with an interiorly threaded metal insert 46 for threaded attachment to the shank 28. As can perhaps best be seen with reference to FIGS. 3, 5 and 6A and B, the metal insert 46 is constructed with enlarged diameter areas 48, of the same or differing diameters, alternating with reduced diameter areas 50, also of the same or differing diameters. As can be seen with reference to FIGS. 6A and B, the top surface of the metal insert 46 may preferably have a polygonal outline, such as the diamond shaped form 52 shown. The enlarged diameter area 48 and reduced diameter area 50, together with the polygonal form 52 together constitute a labyrinthine exterior to the insert 46 to insure against rotation within or pullout from the nonmetal stud during installation and removal, and under the most demanding use conditions. A composite stud is desirable because of its wearability and versatility. The composite stud can be used on any hard surface (e.g., pavement, concrete, etc.), without damaging or destroying the surface. A composite stud of glass and silicone filled industrial grade 6-6 nylon will meet the requirements of current legislation in some states, prohibiting or limiting the use of metal traction devices on paved roadways and on state or public trails.

Figure 10:
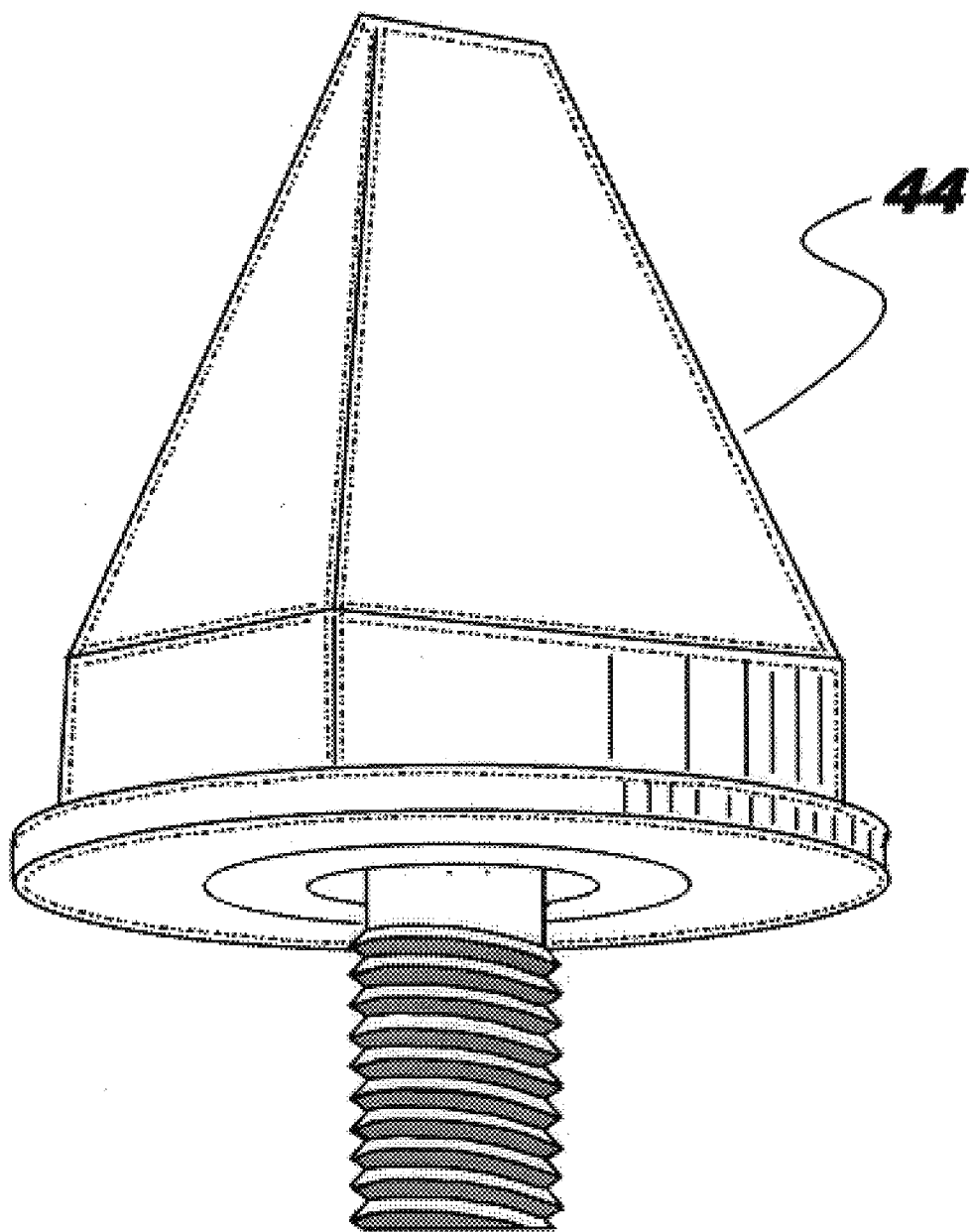
FIG. 10 illustrates a side elevational view of a non-metal stud of this invention for use with a base for a prior known traction device.

As previously mentioned, the stud may be constructed according to various configurations as required by particular use conditions. FIGS. 3, 5, 7, 8, and 9 illustrate some non-limiting examples of various stud configurations. The studs of FIGS. 8 and 9 may each be constructed of metal, such as hardened steel, or of composite, such as glass and silicone filled industrial grade 6-6 nylon. The stud of FIG. 7 may be constricted of steel with a silver-soldered carbide tip 54. The studs may be made to any desired length, so that the height of the traction device 10 is at least greater than the height of the lugs 13 of the belt 12. It should be understood that the shape of the stud is unlimited, and is determined primarily by the conditions under which it is to be used. A suitable stud for use according to the present invention, thus, may have an exterior profile corresponding to any previously known stud, including the profiles of those studs illustrated with respect to U.S. Pat. Nos. 4,758,055 and 5,234,266, and in the catalog, *Parts Unlimited*, published by Lemans Corp., Janesville, Wis., at pages 270–293, inter alia. The different styles of studs are used for various needs (e.g., trail riding, ice drags, oval racing, grass drags, etc.). Alternatively, the stud or the metal insert may have a threaded shaft extending therefrom, as shown in FIG. 10, for attachment to a base of a known traction device, such as the T-nut bases described in the *Parts Unlimited* 1998 catalog, referred to above.

Figure 4:
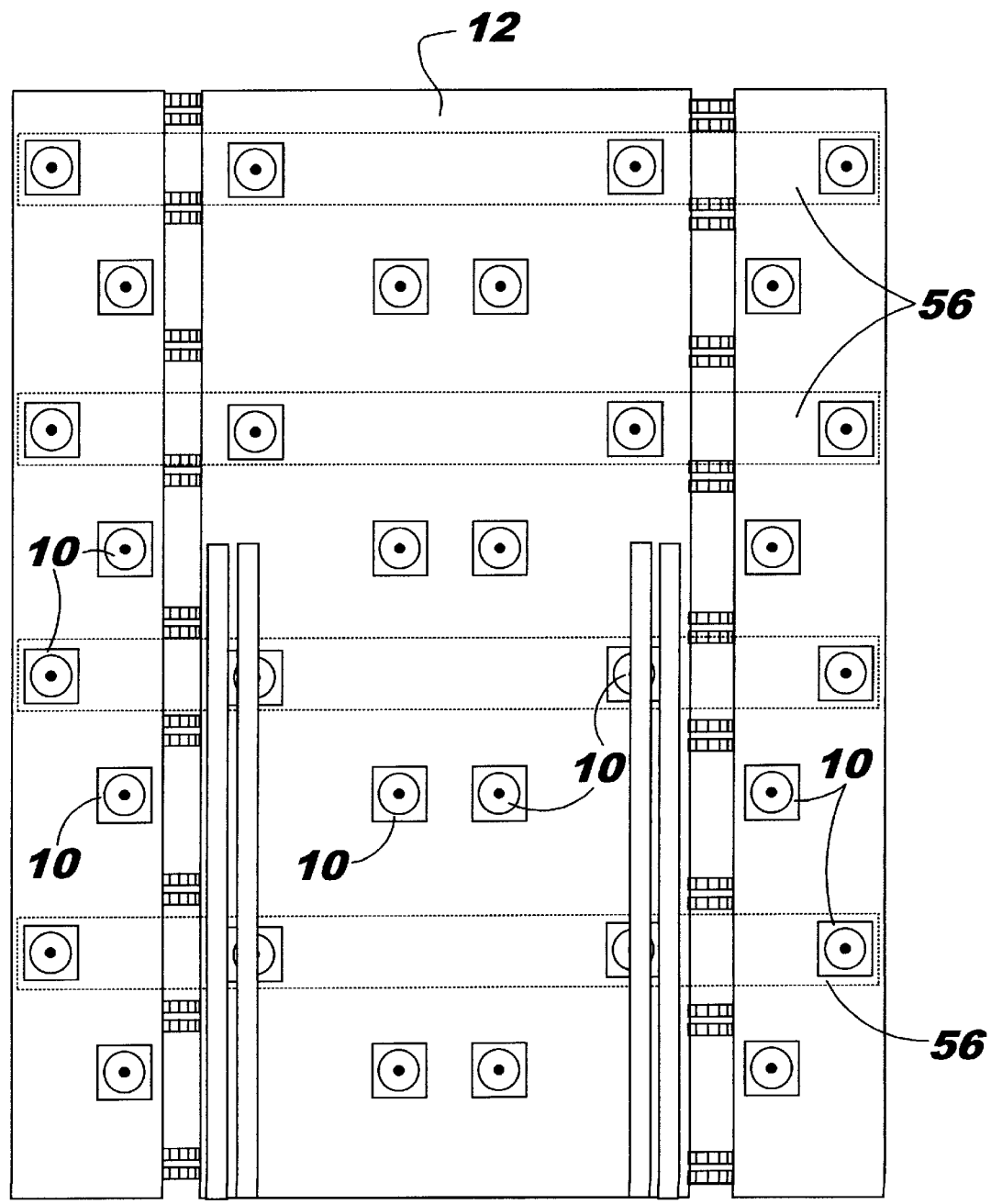
FIG. 4 is sectional plan view illustrating one possible array for mounting a plurality of traction devices of this invention on a snowmobile track.
Figure 11:
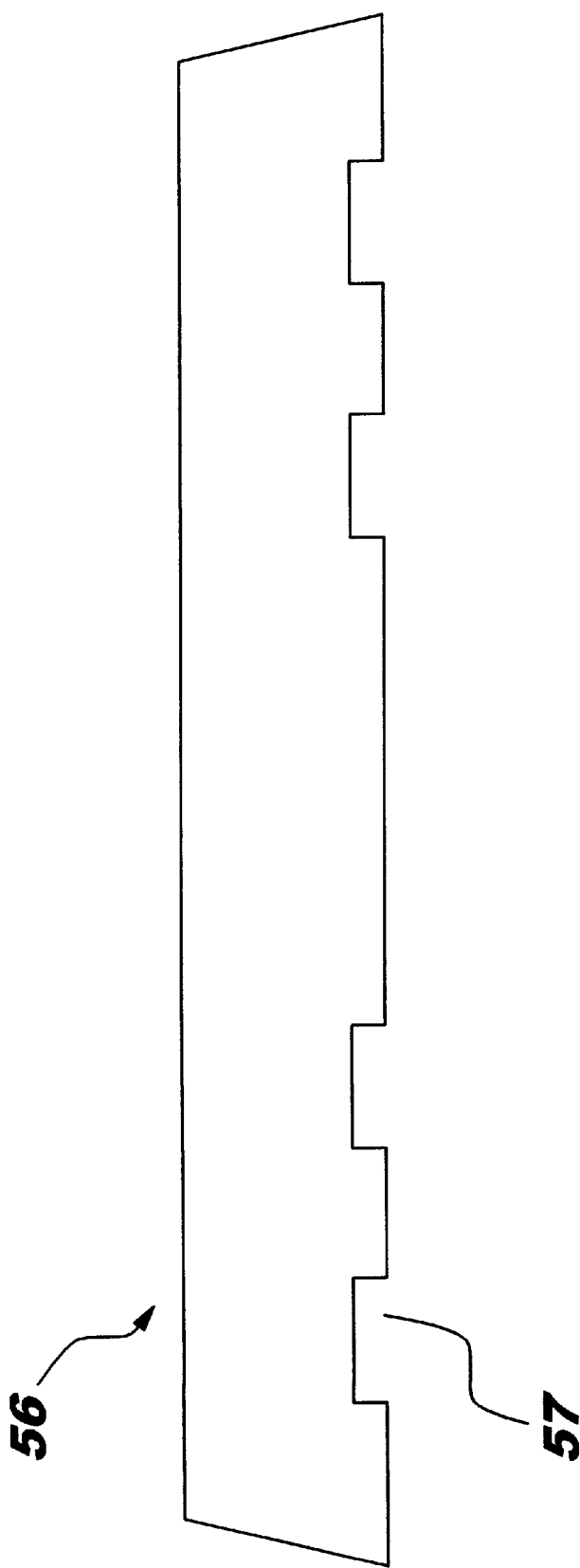
FIG. 11 is a side elevational view of a paddle according to this invention.
Figure 12:
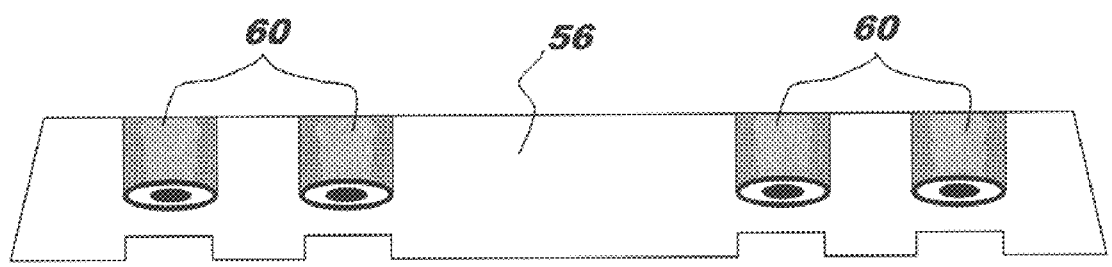
FIG. 12 is a cut-away view of the paddle of FIG. 11.
Figure 13:
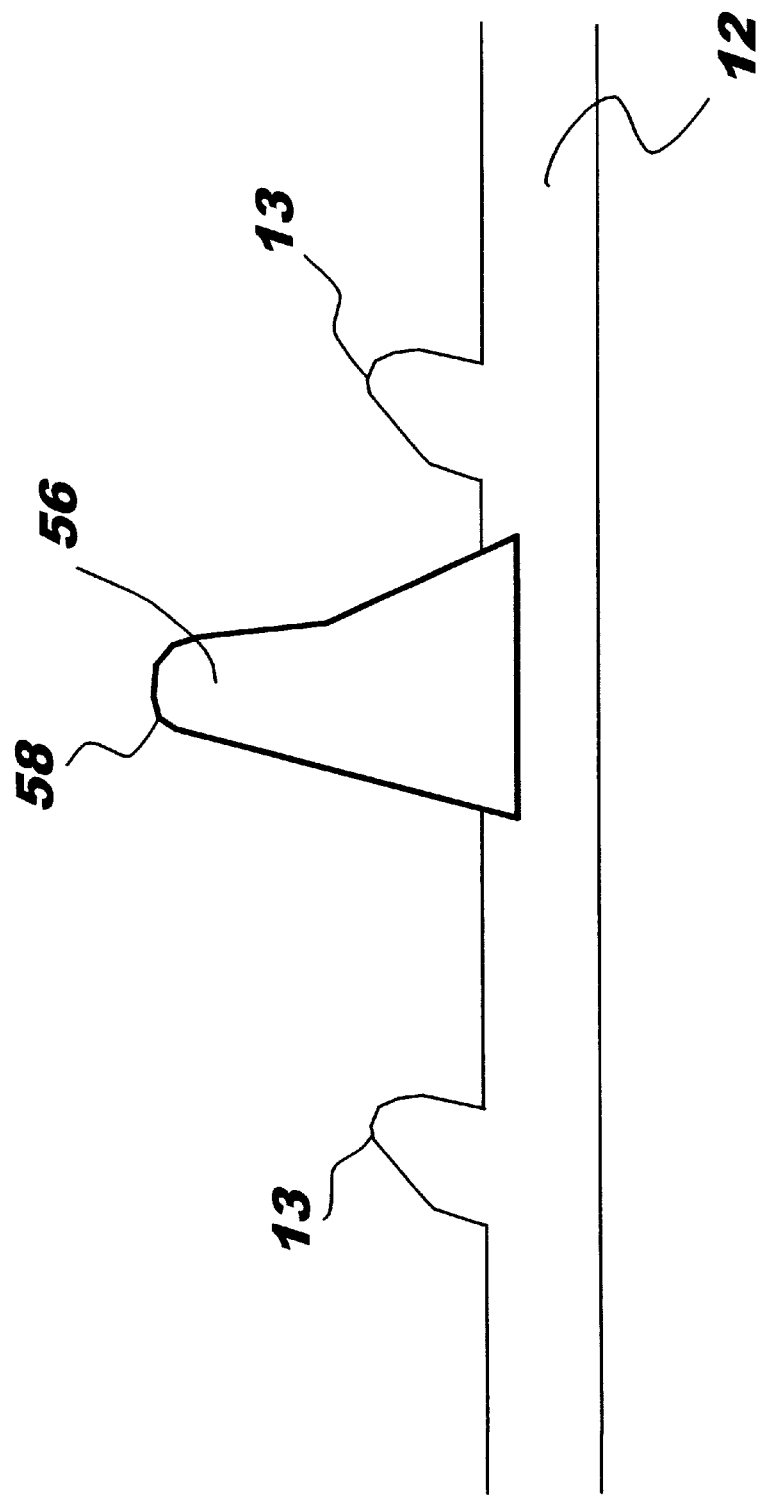
FIG. 13 is an end view of the paddle of FIGS. 11 and 12.

Alternatively, a line of pediments 43 of the device 10, extending across a width of the belt 12 may together retain a paddle 56 for use, for example, under conditions of deep powder snow. A paddle 56 is illustrated, for example, with reference to FIGS. 4, and 11–13. FIG. 4 illustrates a series of paddles 56, shown in phantom, retained in position by a series of traction device pediments 43 across a width of a belt 12. FIG. 11 shows a side elevational view of a paddle 56 showing a series of recesses 57 for attachment across a width of a belt 12. FIG. 12 is a side cut-away view of the paddle 56 showing counterbores 60 for accessing the axial threaded shanks 28. As can be seen with reference to FIG. 13 an end view of the paddle 56 shows the triangular profile. The axially outward apex of the triangular paddle 56 has an access space 58 extending across the width of the belt 12, for access to the shanks 28, for installing end caps on the washers 40 on the threaded shanks 28 to retain the paddle 56 in position.

When it is desired to use the snowmobile 14 with only the traction provided by the belt or track 12, end caps may cover each of the shanks 28. With the end caps installed, the pediment 43 does not project beyond the height of the lugs 13. Thus, the array of pediments 43 may always remain positioned on the belt 12, unobstructing the normal traction of the belt or track 12, ready for quick and easy attachment of the desired traction devices to suit the needs of the riding conditions and surface.

The T-nut 32 and the washer plate 38 are preferably of aluminum, to decrease the overall weight of an array of a plurality of traction devices 10 installed on a snowmobile 14, and to allowed increased speed and fuel economy of the snowmobile 14. The axial threaded shank 28 and the stud 44, if the stud 44 is metal, or the stud insert 46, if the stud 44 is non-metal, are preferably of hardened steel.

As previously mentioned, in an alternative embodiment of a traction device of this invention, the base and the T-nut together may constitute a back piece, having the features and the overall profile of the base and mounted T-nut, and the stud and the washer plate may constitute a top, having the features and the overall profile of the washer plate and the stud. The top, according to this alternate embodiment, may have the stud formed of composite and the metal insert and the washer plate may be constructed as a single element, for example of steel, to be retained within the composite stud, as mentioned previously with regard to other composite studs. According to this alternative embodiment, back the piece and the top may be constructed of steel, optionally with a carbide tip. This alternative embodiment of the traction device may otherwise incorporate all of the features of the first embodiment, described herein.

Although the traction device 10 of this invention has been described and illustrated with regard to use on a snowmobile 14, it will be readily understood that these devices may be used on other mobile continuous track devices where increased traction may be required for specific terrain or use conditions.

Having described the traction devices of this invention, it is not intended that this invention should be limited other than as defined by the following claims.

That which is claimed is:

1. A traction device for mounting on an endless track comprising:

an axial threaded shank having a head at one end;

a T-nut, having a base and a neck extending from the base, the neck mountable on the shank, with the base at the shank head;

a washer plate threadably fastenable on the T-nut on the shank; and a non-metal stud threadably mountable on the washer plate on the shank, to fasten the stud and washer plate to the shank.

2. A traction device according to claim 1, wherein the shank head has a hex-shaped tool-receiving recess.

3. A traction device according to claim 1, wherein the washer plate has a concave surface toward the T-nut and a convex surface toward the stud.

4. A traction device according to claim 1, wherein the washer plate has perimeter recesses for receiving a spanner wrench.

5. A traction device according to claim 1, wherein the stud and the shank are steel and the T-nut and the washer plate are aluminum.

6. A traction device according to claim 1, wherein the stud is composite.

7. A traction device according to claim 1, wherein the stud has an interiorly threaded metal insert for threaded attachment to the shank.

8. A stud for a traction device for mounting on a snowmobile track or the like, wherein the stud is non-metal.

9. A stud according to claim 8, wherein the stud is composite.

10. A stud according to claim 8, wherein the stud has an interiorly threaded metal insert.

11. A stud according to claim 8, wherein the stud is glass-filled industrial grade nylon.

12. A snowmobile track in combination with a traction device wherein:

the snowmobile track has a belt with an opening through the belt; and the traction device includes:

an axial threaded shank having a head at one end;

a T-nut, having a base and a neck extending from the base, the neck mountable on the shank, with the T-nut base at the shank head, the shank and T-nut neck positionable through the opening, with the shank head and T-nut base at an inner belt surface;

a washer plate threadably mountable on the T-nut on the shank, at an outer belt surface, to fasten the washer plate to the shank; and a non-metal stud threadably mountable on the washer plate on the shank, to fasten the stud and washer plate to the shank.

13. The combination according to claim 12, wherein the shank head has a securing-tool-shaped recess.

14. The combination according to claim 12, wherein the washer plate has a concave surface toward the T-nut and a convex surface toward the stud.

15. The combination according to claim 12, wherein the washer plate has securing-tool-shaped recesses.

16. The combination according to claim 12, wherein the T-nut and the washer plate are aluminum.

17. The combination according to claim 13, wherein the shank is steel.

* * * * *